United States Patent
Ito (10) Patent No.: US 7,783,171 B2
(45) Date of Patent: Aug. 24, 2010

(54) DATA RECORDING/REPRODUCING SYSTEM, STORAGE DEVICE, AND FILE ACCESS METHOD

(75) Inventor: Hiromichi Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1372 days.

(21) Appl. No.: 10/846,559

(22) Filed: May 17, 2004

(65) Prior Publication Data

US 2005/0210519 A1    Sep. 22, 2005

(30) Foreign Application Priority Data

Mar. 19, 2004    (JP) .............................. 2004-079455

(51) Int. Cl.
*H04N 5/00* (2006.01)
*H04N 7/00* (2006.01)
(52) U.S. Cl. .................. 386/125; 386/95; 386/126
(58) Field of Classification Search ............ 386/52, 386/46, 113, 125, 126, 95
See application file for complete search history.

(56) References Cited

U.S. PATENT DOCUMENTS

| | | | | |
|---|---|---|---|---|
| 5,257,142 | A * | 10/1993 | Hong | 386/46 |
| 5,260,801 | A * | 11/1993 | Temma et al. | 386/122 |
| 5,884,141 | A * | 3/1999 | Inoue et al. | 725/101 |
| 6,445,654 | B1 * | 9/2002 | Hayakawa et al. | 369/47.23 |
| 6,763,400 | B2 * | 7/2004 | Numano et al. | 710/14 |
| 7,215,611 | B2 * | 5/2007 | Yanase et al. | 369/47.13 |

| | | |
|---|---|---|
| 2003/0081938 | A1 | 5/2003 Nishimura et al. |
| 2003/0190160 | A1 * | 10/2003 Marumori et al. .......... 386/126 |

FOREIGN PATENT DOCUMENTS

| | | |
|---|---|---|
| JP | 2000-195239 | 7/2000 |
| JP | 2001-014110 | 1/2001 |
| JP | 2001-245240 | 9/2001 |
| JP | 2001-256725 | 9/2001 |
| JP | 2003-123379 | 4/2003 |
| JP | 2003-125358 | 4/2003 |
| JP | 2003-141814 | 5/2003 |
| KR | 2001-53815 | 7/2001 |
| WO | WO 2004/021350 | 3/2004 |

OTHER PUBLICATIONS

Office Action issued in Japanese Patent No. 2005-078372 on Mar. 3, 2009.

* cited by examiner

*Primary Examiner*—Thai Tran
*Assistant Examiner*—Gelek Topgyal
(74) *Attorney, Agent, or Firm*—Antonelli, Terry, Stout & Kraus, LLP.

(57) ABSTRACT

An audio/video storage device using a hard disk speeds up the start of reproduction of an audio/video file and reduces power consumption and a noise level. A data recording/reproducing system of the present invention has a hard-disk drive and a flash memory device. When an audio/video file is recorded, the entirety of the file is stored into the hard-disk drive and a starting section of the file is stored into the flash memory device. When the file is reproduced, the reproduction is started from the starting section of the file that was stored into the flash memory device, and the remaining sections that follow the starting section are reproduced from an internal hard disk of the hard-disk drive.

9 Claims, 10 Drawing Sheets

DATA RECORDING/REPRODUCING SYSTEM, STORAGE DEVICE, AND FILE ACCESS METHOD

CLAIM OF PRIORITY

The present application claims priority from Japanese application serial no. 2004-079455, filed on Mar. 19, 2004, the content of which is hereby incorporated by reference into this application.

BACKGROUND OF THE INVENTION

The present invention relates to a system for recording and reproducing data, and more particularly to a data recording/reproducing system, data storage device, and file access method suitable for recording and reproducing audio, video, and other data.

For example, Patent Reference 1 (refer to Japanese Patent Laid-open No. 2001-14110, page 12, FIG. 1) discloses an audio/video data recording and reproducing system having a low-speed optical disk drive and a high-speed hard-disk drive. In this system, entire data of an audio/video file and only a starting section of the data of the audio/video file are recorded beforehand in the optical disk drive and the hard-disk drive, respectively. When the file is reproduced, the reproduction is started using the starting section stored within the hard-disk drive and at the same time, data that follows the starting section is transferred from the optical disk drive to, and recorded in, the hard-disk drive. Thus, the entire file is continuously reproduced from the hard-disk drive. According to the configuration of this system, reproduction of audio/video data from the optical disk drive slow in storage medium loading, startup, and the like, can be conducted rapidly.

The concept of this system for recording and reproducing digitized audio/video data is described below using FIG. 2. Numeral 1 denotes a data recording/reproducing system, 2 a tuner for receiving TV broadcast data, 3 an antenna, 7 an MPEG decoder for decompressing compressed audio/video data, and 8 an on-screen display controller for displaying channel information, volume information, and the like, in a superimposed condition on an output of the MPEG decoder 7. Numeral 9 denotes a display, 6 a hard-disk drive, 5 a data recording/reproducing controller for recording data in and reproducing it from the hard-disk drive 6, and 4 a stream controller for controlling the flow of audio/video data, the conversion of a format, and the like. Numeral 11 denotes a CPU for controlling the operation of this entire data recording/reproducing system, 12 a ROM within which programs of the CPU 11 are prestored, and 13 a RAM that is used when the programs are executed.

When a TV broadcast is viewed in real time, output data from the tuner 2 is sent to the MPEG decoder 7 via the stream controller 4, then decompressed by the MPEG decoder 7, and displayed on the display 9 via the on-screen display controller 8. In addition, when a TV broadcast is recorded, output data from the tuner 2 is sent to the recording/reproducing controller 5 via the stream controller 4 and then recorded in the hard-disk drive 6. Furthermore, when recorded broadcast data is viewed, the recording/reproducing controller 5 reads out desired data from the hard-disk drive 6 and delivers the data to the stream controller 4, which then displays the data on the display 9 via the MPEG decoder 7 and the on-screen controller 8.

By recording/reproducing compressed audio/video data using the random-accessible hard-disk drive 6, excellent characteristics in terms of operational convenience, such as the ability to read out desired data rapidly from a large volume of stored data, can be supplied in comparison with a recording/reproducing system that uses a recording tape.

Figure 3:
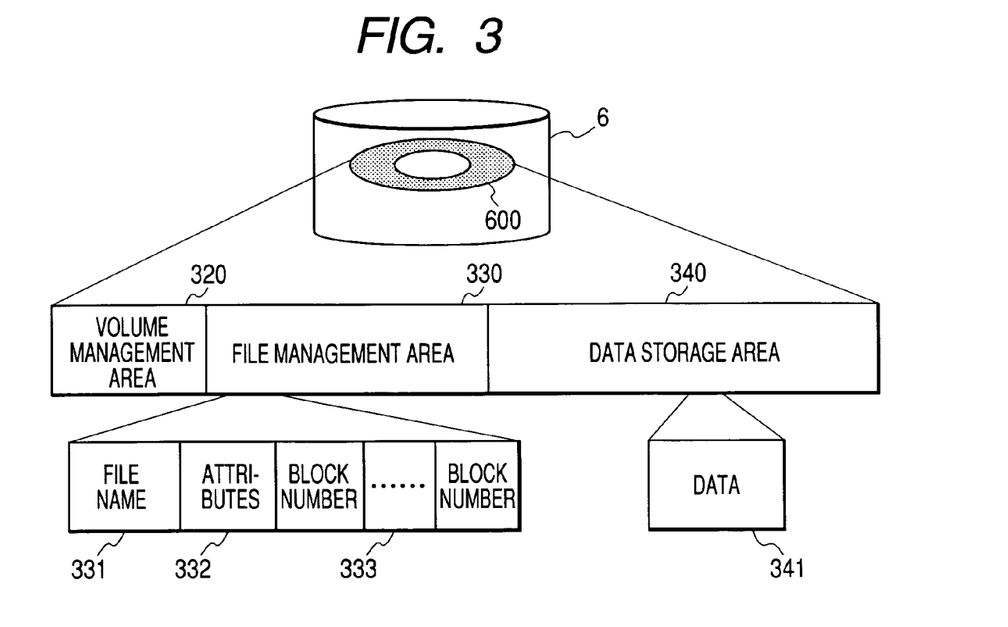
FIG. 3 shows an example explaining an internal recording format of a hard-disk drive of the present invention.

FIG. 3 is a diagram showing the concept of the recording format used when the above-mentioned audio/video data is recorded in an internal hard disk 600 of the hard-disk drive 6. Storage area of the hard disk 600 is composed of a volume management area 320, a file management area 330, and a data storage area 340. In the file management area 330 is stored a file name 331 of a file, attributes 332 that denote a size of the file, access control with respect to the file, and other factors, and a block number 333 denoting a location at which a data entity of the file is recorded. The block here refers to a unit of handling an "s" number of sectors each of which is a minimum segment unit on the hard disk 600, and an "s" number of blocks in succession are allocated to one block. During operation, the aforementioned recording/reproducing controller 5 first accesses the volume management area 320 prestored in a zone which starts from a starting sector of the hard-disk drive 6. Next after acquiring a starting block number of the file management area 330, the recording/reproducing controller 5 converts the block number into a sector number, then reads out the file management area 330, and acquires the block number 333 under which data of the desired file is prestored. After this, the recording/reproducing controller 5 calculates the sector number from the block number and specifies the sector number so as to read out data 341.

SUMMARY OF THE INVENTION

In the above conventional method, however, there has been the problem that since audio/video data is always read out from the hard-disk drive, a delay at the start of reproduction due to the seek time and access time required of the hard-disk drive cannot be avoided. In addition, there has been the problem that when rotation of a spindle of the hard-disk drive is to be stopped to save electric power and/or to reduce noise, the above-mentioned delay at the start of reproduction becomes significant since a long time is required for the hard-disk drive to be made accessible by rotating the spindle once again. Similarly, there has been the problem that when a desired audio/video file is searched for from the plurality of files pre-recorded in the hard-disk drive, noises are caused by frequent seek operation of a head of the hard disk. Furthermore, there has been the problem that when compressed audio/video data is reproduced, since about one second is required for decompression, there occurs a delay from the start of the reproduction to the start of actual video display. Besides, in the method described in the aforementioned Patent Reference 1, it is necessary to transfer from the optical disk drive to the hard-disk drive the remaining sections of audio/video data that follow the starting section of the data, and then to read out and reproduce a desired section from the optical disk drive while at the same time, writing the above data into the hard-disk drive. Accordingly, this method, compared with a normal method of reproduction, requires a twice read/write bandwidth in the hard-disk drive. In addition, although the operation of the hard-disk drive is faster than that of the optical disk drive, for example, when a spindle motor rotating the rotating disk is stopped to save power, the restart of the spindle motor requires a time and generates a starting sound stronger than during steady rotation. These have posed problems in terms of performance, power consumption, noise, and the like.

An object of the present invention, therefore, is to provide a data recording/reproducing system that solves the foregoing problems and does not cause a delay at the start of reproduction of audio/video data due to a hard-disk drive starting time, seek time, or access time.

Another object of the present invention is to provide a data recording/reproducing system that does not cause a delay at the start of reproduction of audio/video data due to data decompression.

A yet another object of the present invention is to provide a data storage device short in readout delay time at the start of readout of audio/video data, and connectable using an interface similar to that of a conventional hard-disk drive.

In order to solve the above problems, in a data recording/reproducing system according to the present invention, a hard-disk drive and a semiconductor storage device are equipped and when an audio/video data file is recorded in the data recording/reproducing system, a starting section of the file is stored into the semiconductor storage device. In addition, the entire file is stored into the hard-disk drive. When the file is reproduced, the starting section of the file stored in the semiconductor storage device is reproduced therefrom and the remaining sections that follow the starting section are reproduced from the hard-disk drive.

In order to solve the above problems, in another data recording/reproducing system according to the present invention, a hard-disk drive and a semiconductor storage device are equipped and when an audio/video data file is recorded in the data recording/reproducing system, a starting section of the file is stored into the semiconductor storage device. In addition, data in the sections following the starting section of the file is stored into the hard-disk drive. When the file is reproduced, the starting section of the file stored in the semiconductor storage device is reproduced therefrom and the remaining sections that follow the starting section are reproduced from the hard disk drive.

In order to solve the above problems, in a yet another data recording/reproducing system according to the present invention, a hard-disk drive and a semiconductor storage device are equipped and when an audio/video data file is recorded in the data recording/reproducing system, data in a starting section of the file is stored in a decompressed format into the semiconductor storage device. In addition, data in the sections that follow the starting section of the file is stored in a compressed format into the hard-disk drive. When the file is reproduced, the starting section of the file stored in the semiconductor storage device is reproduced therefrom and the remaining sections that follow the starting section are read out, decompressed, and reproduced from the hard disk drive.

In addition, in order to solve the above problems, a data storage device according to the present invention includes an external interface means similar to that of a conventional hard-disk drive, a hard-disk storage means, a semiconductor storage means, and an access means. Depending on the access area specified by an area number (such as a logical sector number) when a hard-disk drive is accessed, the access means determines whether the foregoing hard-disk storage means or semiconductor storage means is to be accessed.

In the data recording/reproducing systems according to the present invention, since the data within the semiconductor storage device is used at the start of the reproduction of the audio/video data files, this is effective in that there occurs no delay at the start of reproduction of audio/video data due to a hard-disk drive starting time, seek time, or access time. In addition, since, even for file searching or other operations that require accessing only starting sections of a large number of audio/video data files, there is no need to start or access the hard-disk drive, there are the effects that rapid searching is possible and that a starting sound, a seek sound, and other noise can be prevented from occurring.

Furthermore, since the storage device of the present invention has both a hard-disk storage means and a semiconductor storage means as storage means usable for recording audio/video data and can conduct accessing via an interface similar to that of a conventional hard-disk drive, there is the effect that the above-mentioned data recording/reproducing systems according to the present invention can be easily realized.

According to the present invention, it is possible to provide an easy-to-use data recording/reproducing system, data storage device, and file access method.

DESCRIPTION OF THE PREFERRED EMBODIMENTS

Rapid start of reproduction of an audio/video file is implemented with minimum modifications to software and hardware of a data recording/reproducing system, by utilizing the characteristic that audio/video files have a large data size per file, and recording a starting section of a desired file in a flash memory device which is a semiconductor storage device having a small capacity compared with that of a hard disk.

Embodiment 1

An embodiment of the present invention is described below using the accompanying drawings.

Figure 1:
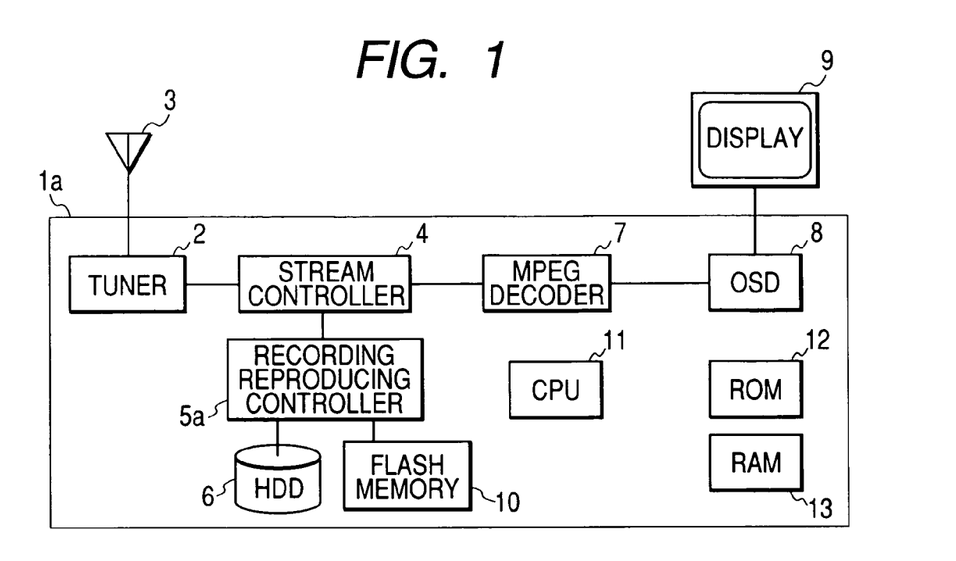
FIG. 1 is a configuration diagram showing an example of a data recording/reproducing system according to Embodiment 1 of the present invention.

First, the total system configuration is described. FIG. 1 is a configuration diagram showing an example of a data recording/reproducing system according to Embodiment 1 of the present invention. Numeral 1a denotes the data recording/reproducing system, 2 a tuner for receiving TV broadcast data, 3 an antenna, 7 an MPEG decoder for decompressing compressed audio/video data, and 8 an on-screen display controller for displaying channel information, volume information, and the like, in a superimposed condition on an output of the MPEG decoder 7. Numeral 9 denotes a display, 6 a hard-disk drive, 5a a data recording/reproducing controller for recording data in and reproducing it from the hard-disk drive 6 and a flash memory device 10, and 4 a stream controller for controlling the flow of audio/video data, the conversion of a format, and the like. Numeral 11 denotes a CPU for controlling the operation of this entire data recording/reproducing system, 12 a ROM within which programs of the CPU 11 are prestored, and 13 a RAM that is used when the programs are executed.

Figure 2:
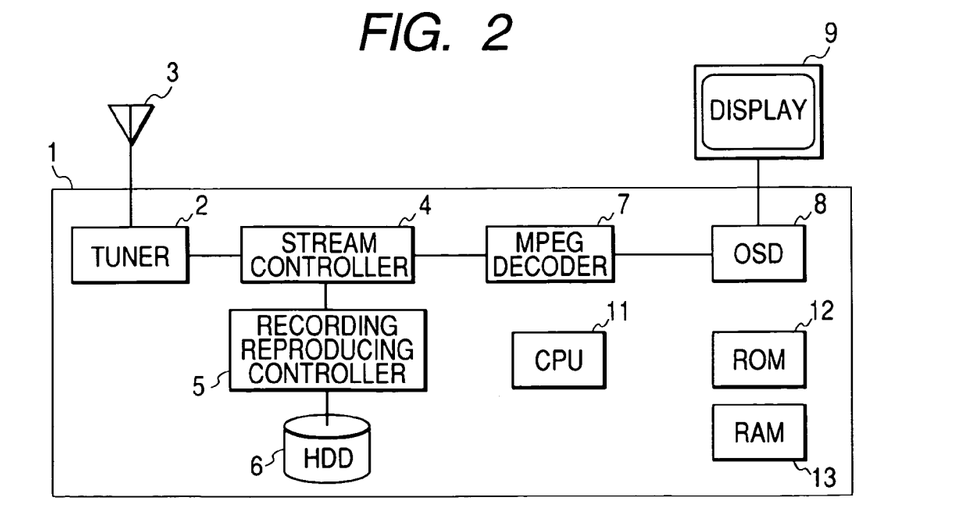
FIG. 2 is a configuration diagram explaining a concept of the data recording/reproducing system of the present invention.

In the present embodiment, the flash memory device 10 including a nonvolatile semiconductor memory is added to the recording/reproducing concept described using FIG. 2. Thus, the data recording/reproducing controller 5a similar to the conventional type of data recording/reproducing controller 5 in FIG. 2 can perform the operation set forth below.

In the present embodiment, when a TV broadcast is recorded, output data from the tuner 2 is sent to the recording/reproducing controller 5a via the stream controller 4 and recorded in the hard-disk drive 6. At the same time, only a starting section of the broadcasting program to be recorded is also recorded in the flash memory device 10. When recorded broadcast data is viewed, the recording/reproducing controller 5a reads out from the flash memory device 10 a starting section of the data to be reproduced, and reads out from the hard-disk drive 6 the data sections that follow the starting section. After this, the recording/reproducing controller 5a sequentially delivers both the starting data section and the following data sections to the stream controller 4, which then displays all the entire data on the display via the MPEG decoder 7 and the on-screen display controller 8.

Figure 4:
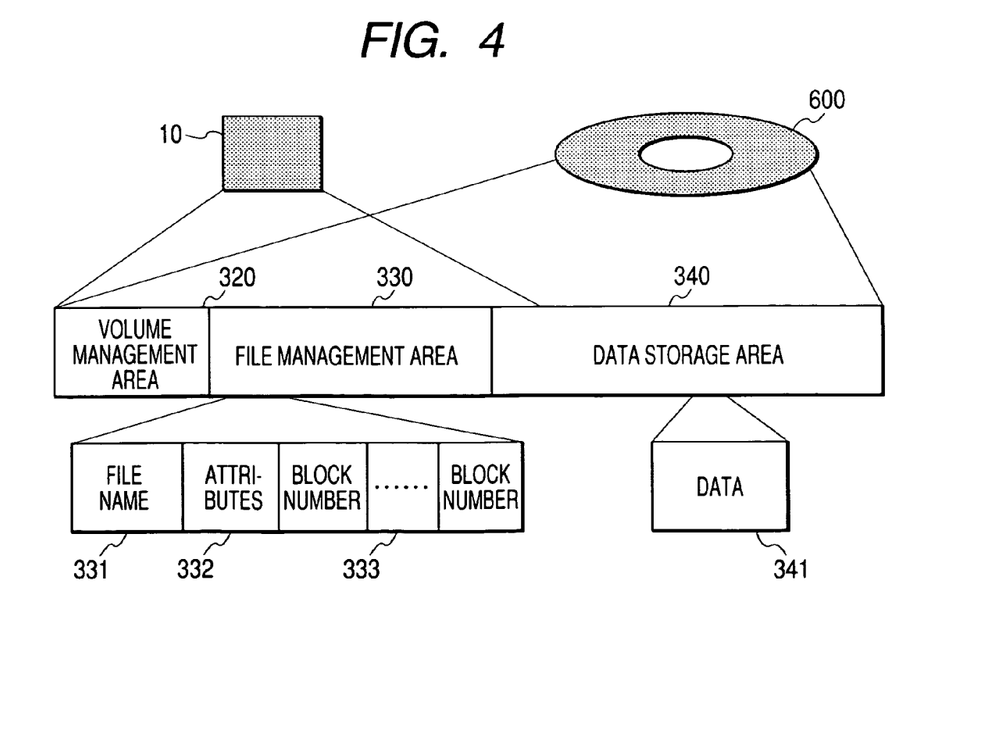
FIG. 4 shows an example of a recording format according to Embodiment 1 of the present invention.

FIG. 4 shows an example of the recording format used for the hard-disk drive 6 and flash memory device 10 in the present embodiment. A volume management area 320 and a file management area 330 are used for recording the same data in the hard-disk drive 6 and flash memory device 10. A data storage area 340 is used to record the entire data in the hard-disk drive 6 and record only starting "p" blocks of the file in the flash memory device 10. In the present embodiment, "p" is to be taken to mean the number of blocks required for a user to store, for example, 30 seconds of data in order to confirm details of the audio/video data recorded in the file.

Figure 8:
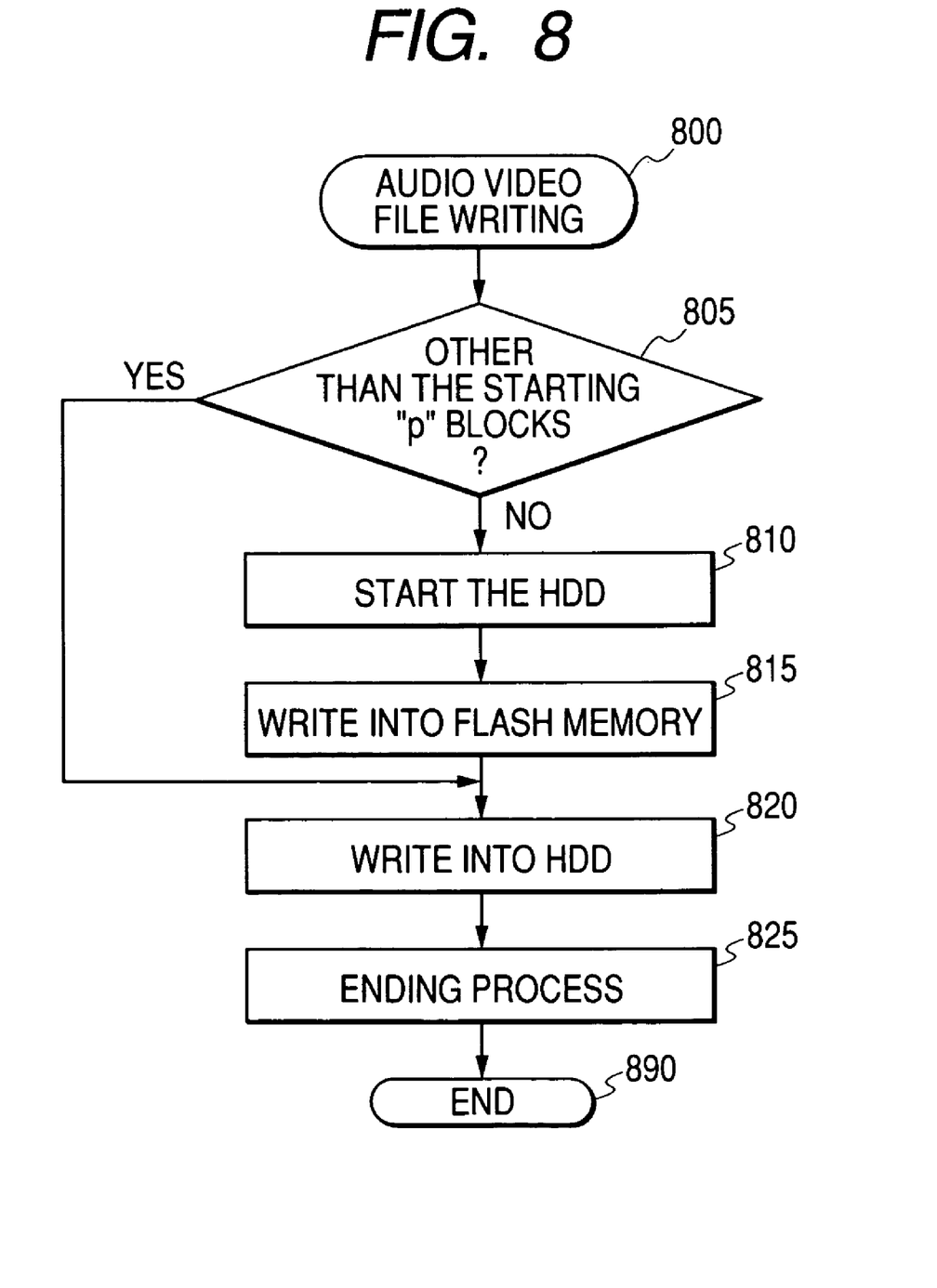
FIG. 8 is a diagram showing an example of the flow of an audio/video file writing program according to Embodiment 1 of the present invention.

FIG. 8 is a flowchart of an audio/video file writing program 800 executed by the CPU 11 by operations of the recording/reproducing controller 5a in the present embodiment. First, the writing block number "w" of a file, specified in step 805, is judged whether the block is included in the starting "p" blocks of the file. If the block is judged to be a following data block not included, that block of data is written into the hard-disk drive 6 in step 820, then an ending process is conducted in step 825, and the program ends. If, as a result of the judgment in step 805, the number "w" of the writing block is # included in the starting "p" blocks, such a starting instruction as relating to the start of spindle rotation of the hard-disk drive 6 is issued in step 810 and then that block of data is written into the flash memory device 10 in step 815. Furthermore, in step 820, the same block of data is written into the hard-disk drive 6, then an ending process is conducted in step 825, and the program ends. By issuing, in this way, the starting instruction to the hard-disk drive 6 in step 810 prior to writing data into the flash memory device 10, a latency time during writing into the hard-disk device 6 in step 820 can be reduced since the starting process for the hard-disk drive 6 is performed concurrently with writing into the flash memory device 10.

Figure 7:
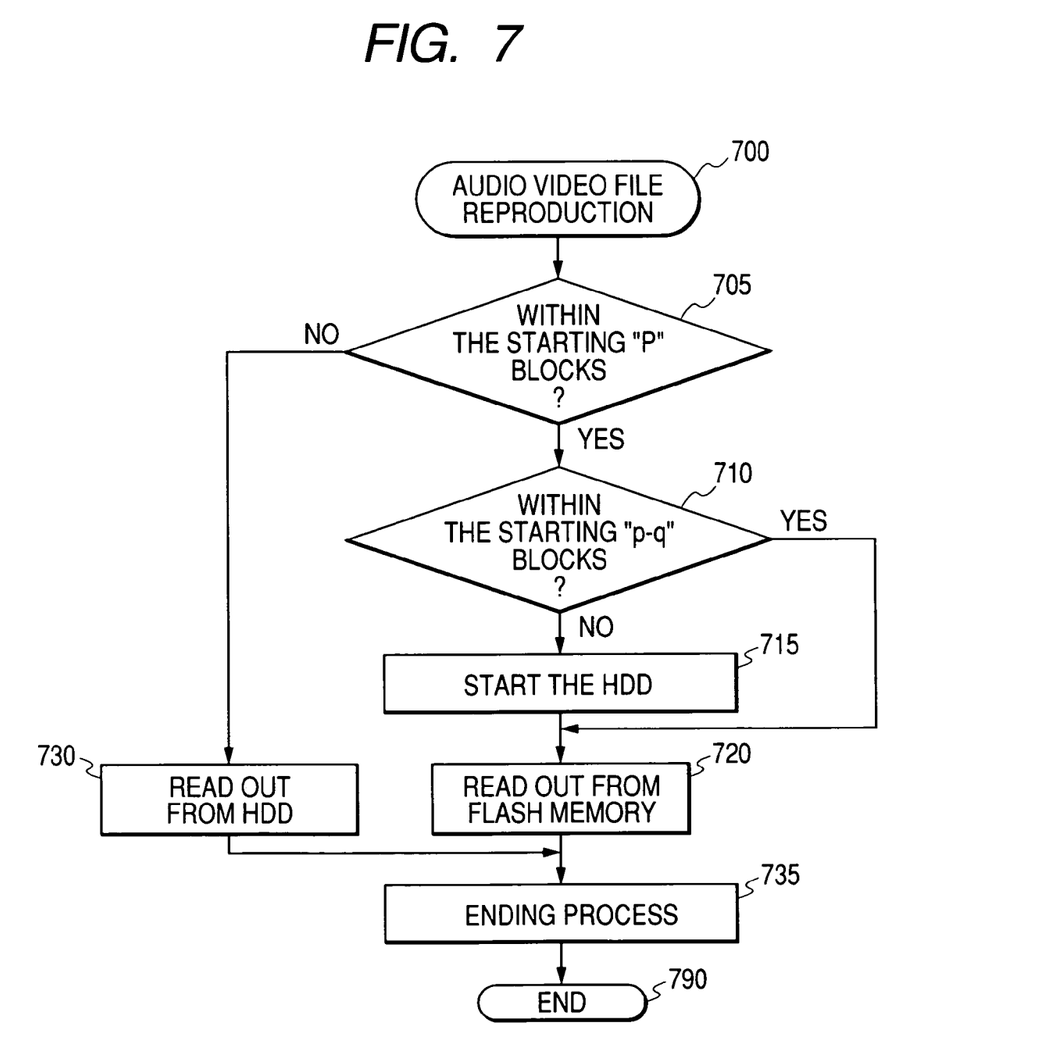
FIG. 7 is a diagram showing an example of the flow of an audio/video file reproduction program according to Embodiment 1 of the present invention.

FIG. 7 is a flowchart of an audio/video file reproduction program 700 executed by the CPU 11 by operations of the recording/reproducing controller 5a in the present embodiment. First, the readout block number "r" of a file, specified in step 705, is judged whether the block is included in the starting "p" blocks of the file. If the block is judged not to be included, that block of data is read out from the hard-disk drive 6 in step 730, then an ending process is conducted in step 735, and the program ends. If, however, in step 705, the number "r" of the readout block is judged to be included in the starting "p" blocks, the program proceeds to step 710. In step 710, the above block number "r" is further judged whether it is included in the starting "(p−q)" blocks, where "q" is an integer satisfying "q<p" and is a number greater than the number of blocks that allows storage of data of a data size equivalent to an equimultiple-speed reproduction time of audio/video data as much as the time required for the start of the hard-disk drive 6.

If, in step 710, the block number is judged not to be included in the starting "(p−q)" blocks, such a starting instruction as relating to the start of spindle rotation of the hard-disk drive 6 is issued in step 715 and then data is read out from that block within the flash memory device 10 in step 720. After this, an ending process is conducted in step 735 and then the program ends. If, in step 710, the block number is judged to be included in the starting "(p−q)" blocks, such a starting instruction as relating to the start of spindle rotation of the hard-disk drive 6 is not issued in step 715 and then data is read out from that block within the flash memory device 10 in step 720. After this, an ending process is conducted in step 735 and the program ends.

By processing described above, since, during readout from the starting "(p−q)" blocks of the file, desired data is read out from the flash memory device 10 without the hard-disk drive 6 being started, a readout starting delay time can be significantly reduced in comparison with that of readout from the hard-disk drive 6. This also allows the hard-disk drive 6 to be reduced in power consumption and in operating sound level. In addition, during readout from a block present between "p−q+1" and "p", since the hard-disk drive 6 is started prior to readout of desired data from the flash memory device 10, when readout of a block whose block number is larger than "p" is conducted following completion of the previous readout operation, the starting process for the hard-disk drive 6 will have been completed. This yields the effect that a change from completion of readout of a starting section from the flash memory device 10 to the start of readout of following sections from the hard-disk drive 6 can be conducted without a latency time.

Embodiment 2

Figure 5:
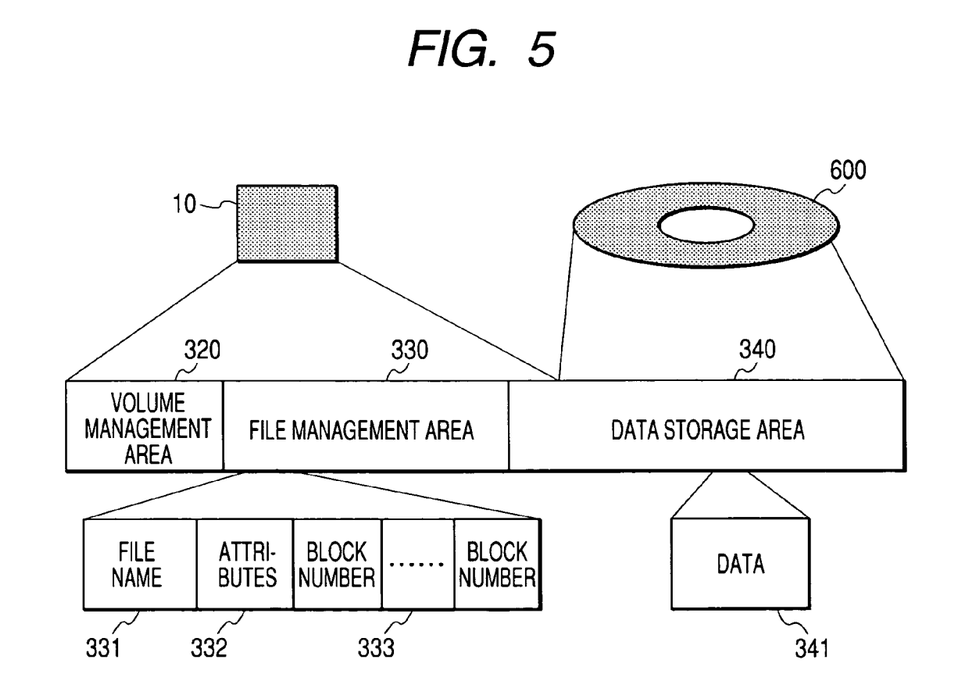
FIG. 5 shows an example of a recording format according to Embodiment 2 of the present invention.
Figure 12:
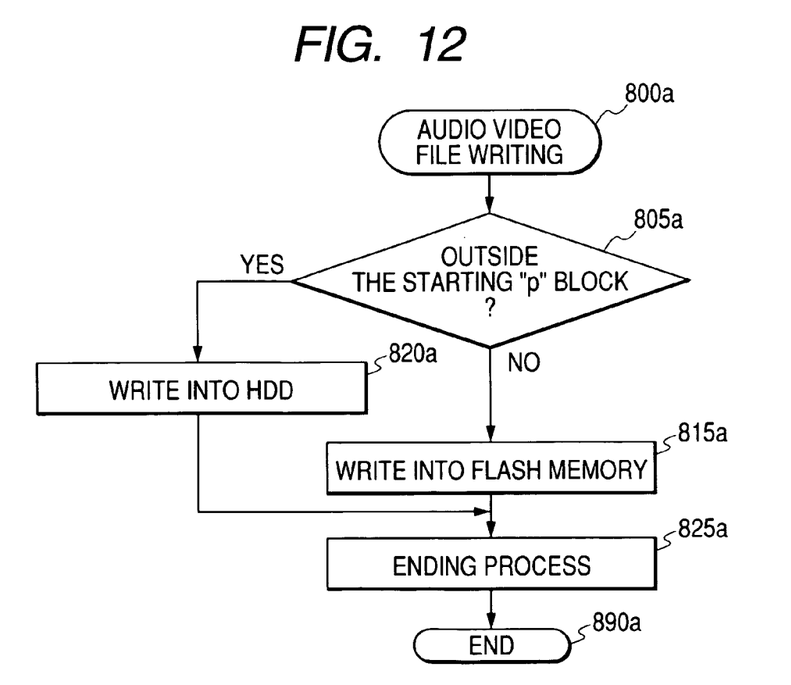
FIG. 12 is a diagram showing an example of the flow of an audio/video file writing program according to Embodiment 2 of the present invention.

Next, another embodiment (Embodiment 2) of the present invention is described using FIG. 5 in which is shown an example of a recording format based on FIG. 12 and Embodiment 2. Since Embodiment 2 has almost the same configuration as that of Embodiment 1, only different sections are described below. FIG. 12 is a flowchart of an audio/video file writing program 800a according to Embodiment 2. First, the writing block number "w" of a file, specified in step 805a, is judged whether the block is included in the starting "p" blocks of the file. If the block is judged to be a following data block not included, that block of data is written into the hard-disk drive 6 in step 820a, then an ending process is conducted in step 825a, and the program ends. If, as a result of the judgment in step 805a, the number "w" of the writing block is included in the starting "p" blocks, that block of data is written into the flash memory device 10 in step 815a, then an ending process is conducted in step 825a, and the program ends. Unlike Embodiment 1, Embodiment 2 causes only the block sections following the starting "p" blocks to be stored into the hard-disk drive 6, as shown in FIG. 5.

Embodiment 3

Figure 6:
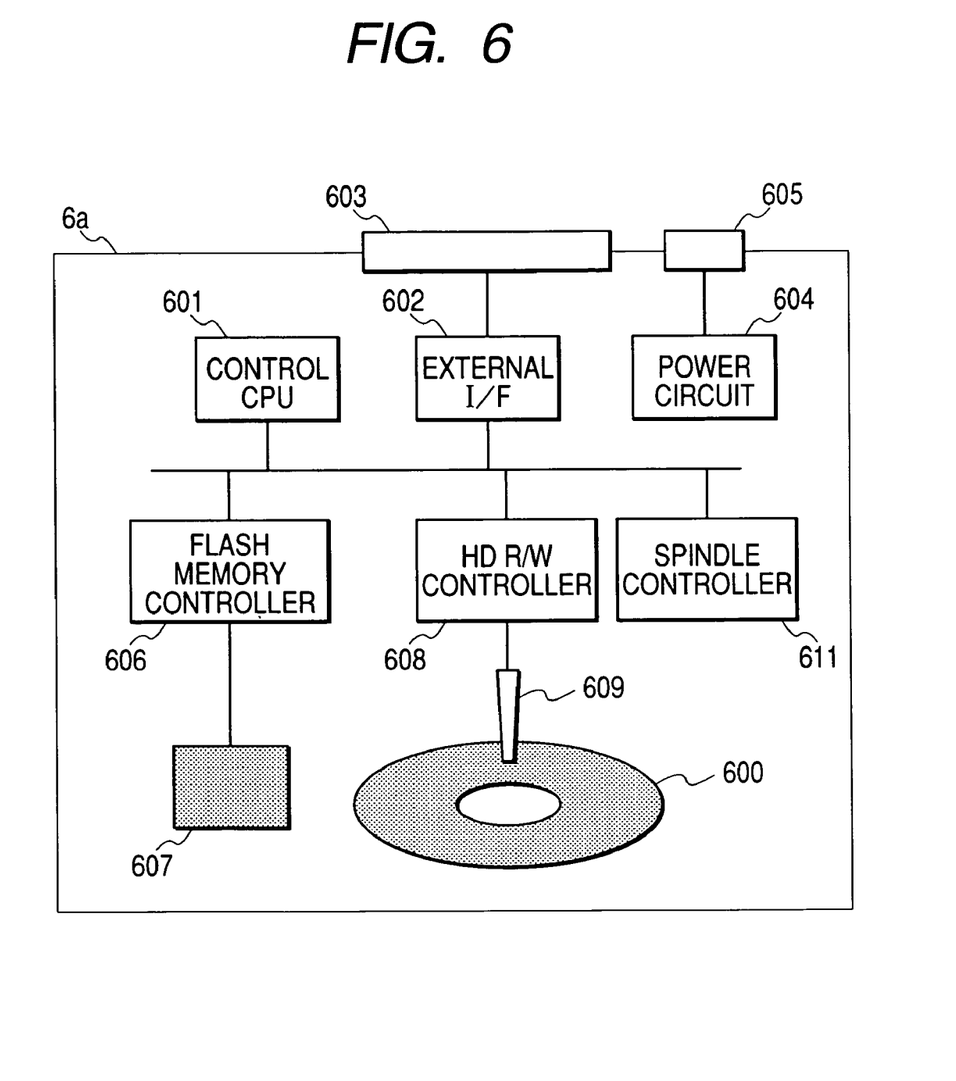
FIG. 6 is a diagram showing a configuration example of a hard-disk drive according to Embodiment 3 of the present invention.

Next, a yet another embodiment (Embodiment 3) of the present invention is described below using FIGS. 6, 9, 10, and 13. FIG. 6 is a diagram showing a configuration example of a hard-disk drive 6a according to Embodiment 3. Numeral 601 denotes a control CPU, numeral 602 an external interface, numeral 603 an external interface connector, numeral 604 a power circuit, numeral 605 a power connector, numeral 608 a controller for controlling read/write operations on a hard disk 600, numeral 609 a head, and numeral 611 a spindle motor controller for the hard disk 600. All of these elements are the same as the means with which is equipped the conventional type of general hard-disk drive 6. In addition to these means, the hard-disk drive 6a in the present embodiment has a flash memory controller 606 and a flash memory device 607.

Figure 13:
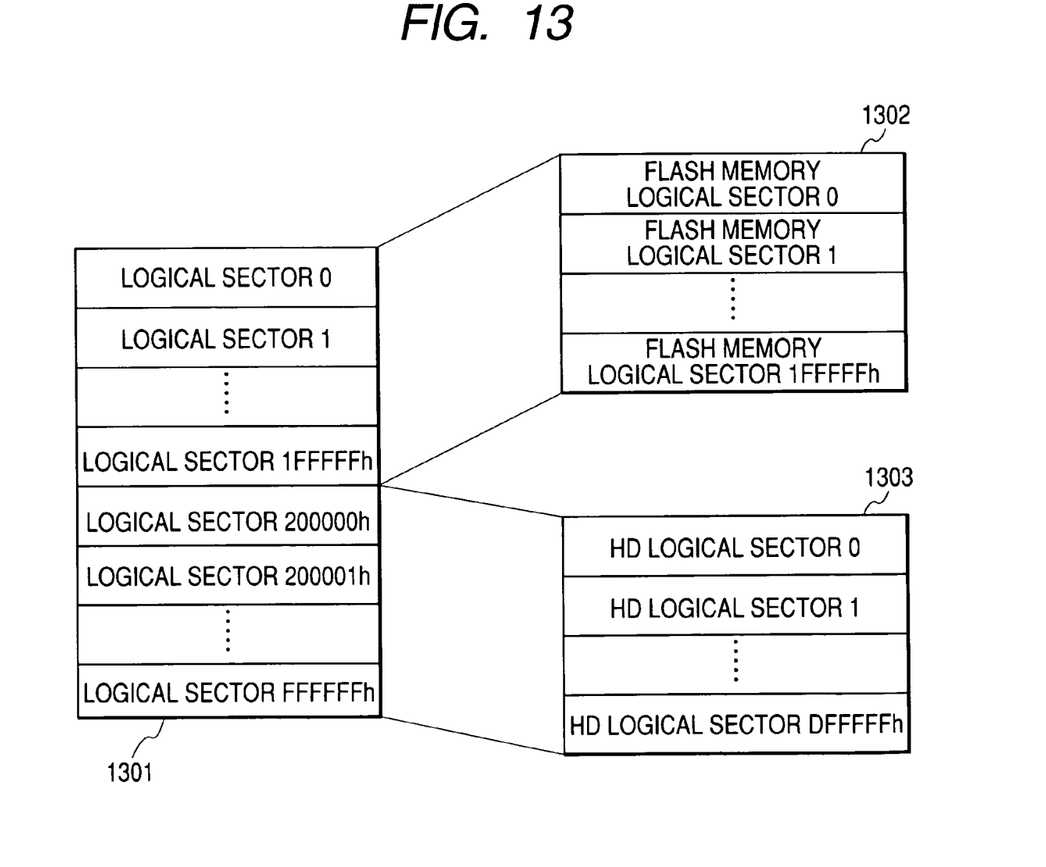
FIG. 13 is a diagram showing an example of the relationship between sectors in Embodiment 3 of the present invention.

FIG. 13 is a diagram showing an example of the relationship between a logical sector number 1301, flash memory logical sector number 1302, and hard-disk logical sector number 1303 of the hard-disk drive 6a. In the present embodiment, sectors 0 to 1FFFFFh of the logical sector number 1301 are allocated to the flash memory 607, and logical sectors 200000h or more are allocated to the hard disk 600. The sector number here means an area number that indicates an internal location of a storage area.

Figure 9:
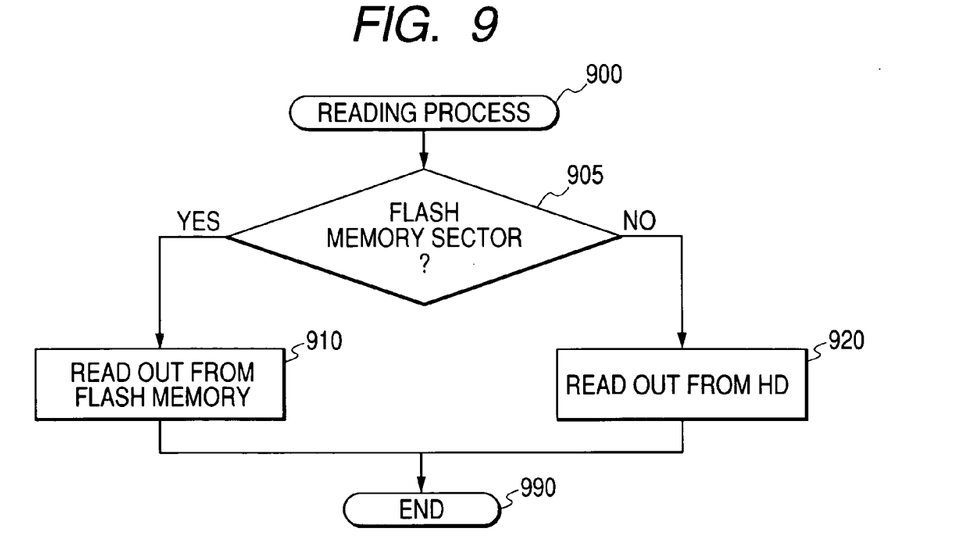
FIG. 9 is a diagram showing an example of the flow of a readout program according to Embodiment 3 of the present invention.
Figure 10:
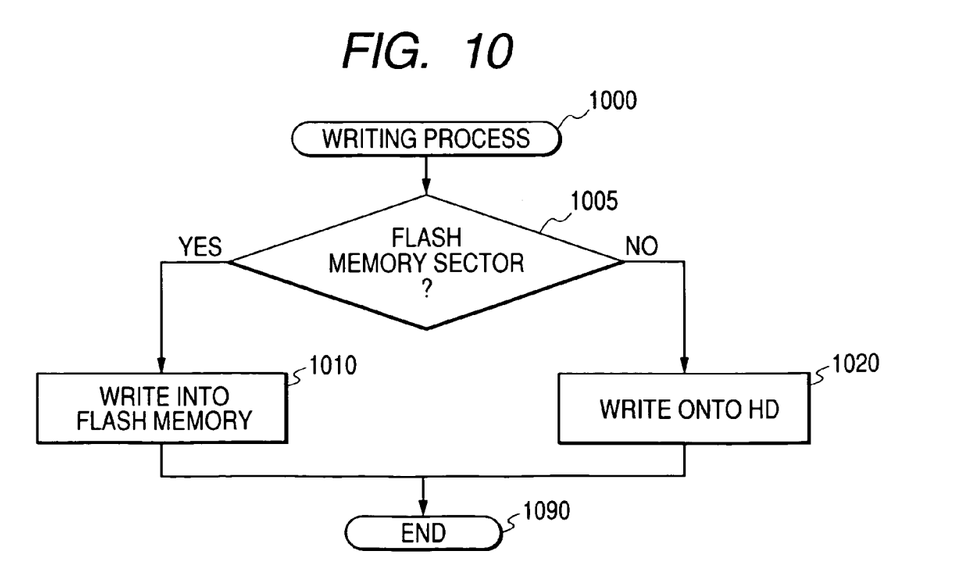
FIG. 10 is a diagram showing an example of the flow of a writing program according to Embodiment 3 of the present invention.

Next, the operation of the hard-disk drive 6a is described using FIGS. 9 and 10. FIG. 9 is a flowchart showing an example of a readout program 900 within the control CPU 601. When a readout command is accepted via the external interface 602, a sector number of a parameter accompanying the aforementioned command is examined in step 905 and if the sector number is 1FFFFFh or less, since it is a sector of the flash memory 607, the program proceeds to step 910 to read out data from the flash memory 607. If the sector number of the aforementioned parameter is 200000h or more, since this indicates readout from the hard disk 600, the program proceeds to step 920 to read out data from the hard disk 600. Next, writing into the control CPU 601 is described using a flowchart that shows an example of a writing program 1000 shown in FIG. 10. When a writing command is accepted via the external interface 602, a sector number of a parameter accompanying the aforementioned command is examined in step 1005 and if the sector number is 1FFFFFh or less, since it is a sector of the flash memory 607, the program proceeds to step 1010 to write data into the flash memory 607. If the sector number of the aforementioned parameter is 200000h or more, since this indicates writing onto the hard disk 600, the program proceeds to step 1020 to write data onto the hard disk 600.

The hard-disk drive 6a of the present embodiment may be applied to the data recording/reproducing system 1 of FIG. 2, and in the recording/reproducing controller 5, the "p" blocks of the starting section of each file to be stored into the aforementioned volume management area 320, file management area 330, and data storage area 340, may be allocated to sectors of the logical sector number 1FFFFFh or less. Thus, similarly to Embodiments 1 and 2, during data readout from the starting blocks of a file, desired data is read out from the flash memory 607 without the hard disk 600 being rotated by the spindle controller 5. Accordingly, a readout starting delay time, compared with that of readout from the hard disk 600, can be reduced significantly. This, in turn, also allows the hard-disk drive 6a to be reduced in power consumption and in operating sound level.

Embodiment 4

Figure 11:
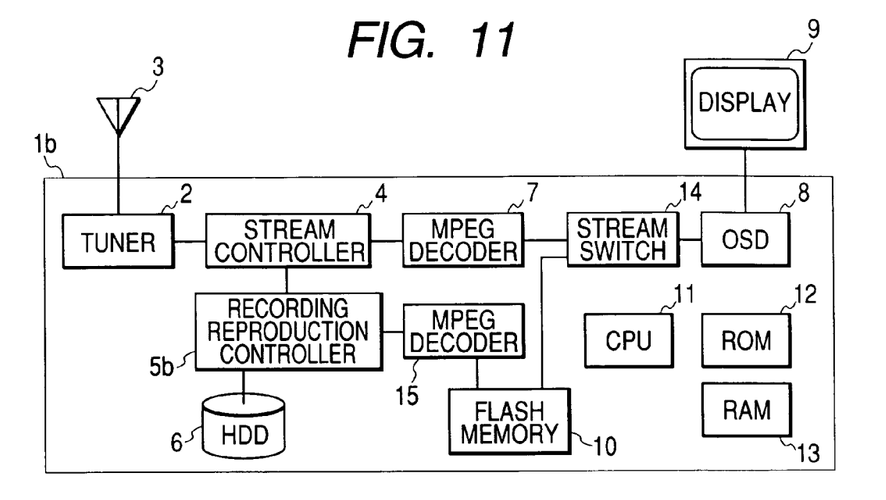
FIG. 11 is a configuration diagram showing an example of a data recording/reproducing system according to Embodiment 4 of the present invention.

Next, a yet another embodiment (Embodiment 4) of the present invention is described below using FIG. 11. FIG. 11 is a diagram showing a configuration example of a data recording/reproducing system 1b according to Embodiment 4. In the present embodiment, an MPEG decoder 15 and a stream switch 14 are provided in addition to the constituting elements of Embodiment 1. Data is written into the flash memory device 10 via the MPEG decoder 15, and audio/video data is stored in a decompressed format. The stream switch 14 conducts switching operations between the data read out from the flash memory device 10, and an output from the MPEG decoder 7, without interrupting audio/video data, and delivers selected data to the on-screen display controller 8. This configuration makes it unnecessary that when a file is reproduced, its starting section that was stored into the flash memory device 10 should not be decompressed with the MPEG decoder 7. Combination of Embodiment 1 or 2 with the present embodiment, therefore, yields the effect that a delay time up to actual output of the audio and video data reproduced, from the display 9, can be further reduced.

Although, in the embodiments described above, the flash memory 607 and the flash memory device 10 are used as a nonvolatile semiconductor memory and device, respectively, it is obvious that similar effects can also be obtained by using other semiconductor memories. Likewise, the same effects can also be obtained by using a storage device equipped with a rotating disk such as an optical disk or optical disk drive, instead of using the hard disk 600 or the hard-disk drive 6.

In addition, although, in the embodiments described above, starting "p" blocks of a file are read out from the flash memory device 10, not only a starting section, but also "p" blocks of data from a section in which audio/video data reproduction was temporarily stopped can be read out from the flash memory device 10.

Embodiment 5

Figure 14:
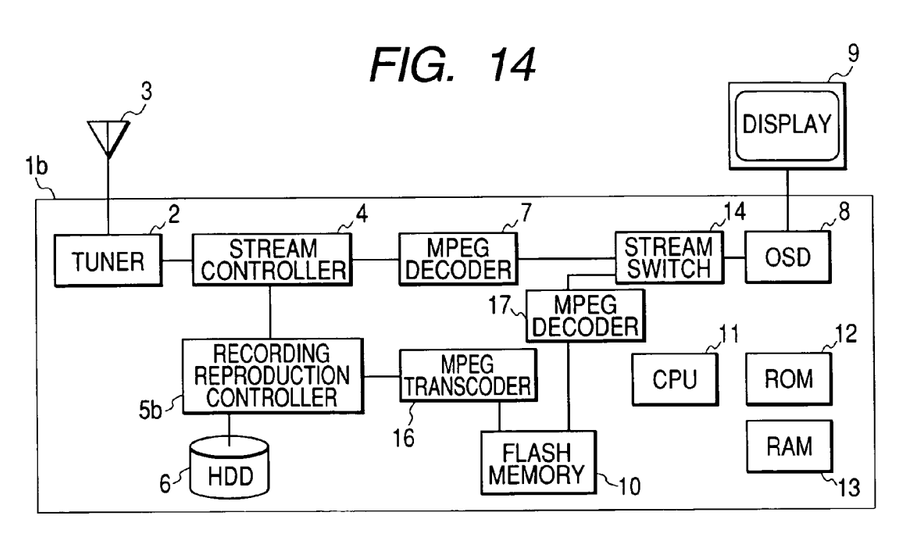
FIG. 14 is a configuration diagram showing an example of a data recording/reproducing system according to Embodiment 5 of the present invention.

Next, a yet another embodiment (Embodiment 5) of the present invention is described below using FIG. 14. FIG. 14 is a diagram showing a configuration example of a data recording/reproducing system 1c according to Embodiment 5. In the present embodiment, an MPEG trans-coder 16 and an MPEG decoder 17 and a stream switch 14 are provided in addition to the constituting elements of Embodiment 1. Data is written into the flash memory device 10 via the MPEG trans-coder 16, and audio/video data is stored in a different compression ratio and/or different resolution than the original data. The MPEG decoder 17 decompresses trans-coded audio/video data read out from the flash memory device 10. The stream switch 14 conducts switching operations between an output from the MPEG decoder 17, and an output from the MPEG decoder 7, without interrupting audio/video data, and delivers selected data to the on-screen display controller 8. This configuration makes it faster that when a file is reproduced, its starting section that was stored into the flash memory device 10 can be decompressed quickly with MPEG decoder 17. Combination of Embodiment 1 or 2 with the present embodiment, therefore, yields the effect that a delay time up to actual output of the audio and video data reproduced, from the display 9, can be further reduced. In addition, this configuration makes it possible that when a file is recorded, its starting section that was stored into the flash memory device 10 can be higher compression ratio or reduced resolution format. This, in turn, also allows the flash memory device 10 to be reduced in the memory size.

The present invention can be easily applied to a video recorder or contents server that uses a hard disk.

What is claimed is:

1. A data recording/reproducing system for recording and reading out data, said data recording/reproducing system comprising:
    a first storage device using a rotating disk; and
    a second storage device using a semiconductor memory:
    wherein, when a file is recorded in said data recording/ reproducing system, the entirety of the file is stored into said first storage device and a starting section of the file is stored into said second storage device, and
    file readout from said data recording/reproducing system is conducted by first reading out all the starting section of the file from the second storage device and then reading out remaining sections of the file directly from the first storage device, wherein:
    after the start of readout of a starting section of the file from said second storage device, when a readout length of time required for readout of all a remaining unread part of the starting section from the second storage device at an equimultiple speed, is longer than a starting length of time required to make reproduction possible with the first storage device when starting from a non-rotational state, a starting process for initiating activation of the first storage device to begin to make reproduction possible is not performed.

2. A file access method for performing file reading/writing operations on storage devices, wherein:
    when a file is recorded, the entirety of the file is stored into a first storage device and only a starting section of the file is stored into a second storage device; and
    when the file is read out, first all the starting section is read out from said second storage device and then the sections following the starting section are read out directly from said first storage device, wherein:
    the file includes audio/video data; and
    after the start of readout of a starting section of the file from said second storage device, when a readout length of time required for readout of all a remaining unread part of the starting section from the second storage device at an equimultiple speed, is longer than a starting length of time required to make reproduction possible with the first storage device when starting from a non-rotational state, a starting process for initiating activation of the first storage device to begin to make reproduction possible is not performed.

3. A data recording/reproducing system for recording and reading out data, said data recording/reproducing system comprising:
    a first storage device using a rotating disk; and
    a second storage device using memory having a faster reproduction startup ability than the first storage device:
    wherein, when a file is recorded in said data recording/ reproducing system, the entirety of the file is stored into said first storage device and a starting section of the file is stored into said second storage device, and
    file readout from said data recording/reproducing system is conducted by first reading out all the starting section of the file from the second storage device and then reading out remaining sections of the file directly from the first storage device, wherein:
    after the start of readout of a starting section of the file from said second storage device, when a readout length of time required for readout of all a remaining unread part of the starting section from the second storage device, is longer than a starting length of time required to make reproduction possible with the first storage device when starting from a non-rotational state, a starting process for initiating activation of the first storage device to begin to make reproduction possible is not performed.

4. The data recording/reproducing system according to claim 3, wherein:
    data of the file which is stored into said first storage device is compressed-format data that is compressed audio/ video data; and
    the starting section of the file that is stored into said second storage device is non-compressed data that is a decompressed starting section of the compressed-format data.

5. The data recording/reproducing system according to claim 3, wherein:
    data of the file which is stored into said first storage device is compressed-format data that is compressed audio/ video data;
    the starting section of the file that is stored into said second storage device is non-compressed data that is a decompressed starting section of the compressed-format data; and
    file readout from said data recording/reproducing system is conducted by reading out only a starting section of the file from said second storage device and then reproducing the starting section without decompressing it, and reading out remaining sections from said first storage device and then reproducing the remaining sections in a decompressed condition.

6. The data recording/reproducing system according to claim 3, wherein:
    data of the file which is stored into said first storage device is compressed audio/video data with a first compressed-format; and
    the starting section of the file that is stored into said second storage device is compressed audio/video data with a second compressed-format that is different from said first compressed-format and a trans-coded starting section of the said first compressed-format data.

7. The data recording/reproducing system according to claim 3, wherein:
    data of the file which is stored into said first storage device is compressed audio/video data with a first compressed-format;
    the starting section of the file that is stored into said second storage device is compressed audio/video data with a second compressed-format that is different from said first compressed-format and a trans-coded starting section of the said first compressed-format data; and
    file readout from said data recording/reproducing system is conducted by reading out only a starting section of the file from said second storage device and then reproducing the starting section with decompressing it, and reading out remaining sections from said first storage device and then reproducing the remaining sections in a different decompressed condition.

8. The data recording/reproducing system according to claim 3, wherein:

data of the file which is stored into said first storage device is compressed audio/video data with a first resolution; and the starting section of the file that is stored into said second storage device is compressed audio/video data with a second resolution that is different from said first resolution and a trans-coded starting section of the said first resolution data.

9. The data recording/reproducing system according to claim 3, wherein:

data of the file which is stored into said first storage device is compressed audio/video data with a first resolution;

the starting section of the file that is stored into said second storage device is compressed audio/video data with a second resolution that is different from said first resolution and a trans-coded starting section of the said first resolution data; and file readout from said data recording/reproducing system is conducted by reading out only a starting section of the file from said second storage device and then reproducing the starting section with decompressing it, and reading out remaining sections from said first storage device and then reproducing the remaining sections in a different decompressed condition.

* * * * *